(12) United States Patent
Carges et al.

(10) Patent No.: US 10,650,461 B2
(45) Date of Patent: May 12, 2020

(54) SYSTEM FOR IMPROVED NETWORK DATA PROCESSING

(71) Applicant: Hartford Fire Insurance Company, Hartford, CT (US)

(72) Inventors: Alex M. Carges, West Hartford, CT (US); Anna M. Martinez, Avon, CT (US); Robert A. Schenkel, West Hartford, CT (US); Michael O. Wardle, Frankfort, NY (US)

(73) Assignee: Hartford Fire Insurance Company, Hartford, CT (US)

( * ) Notice: Subject to any disclaimer, the term of this patent is extended or adjusted under 35 U.S.C. 154(b) by 475 days.

(21) Appl. No.: 14/876,252

(22) Filed: Oct. 6, 2015

(65) Prior Publication Data
US 2017/0098278 A1    Apr. 6, 2017

(51) Int. Cl.
*G06Q 40/00* (2012.01)
*G06Q 40/08* (2012.01)
*G06F 16/2458* (2019.01)

(52) U.S. Cl.
CPC ......... *G06Q 40/08* (2013.01); *G06F 16/2465* (2019.01)

(58) Field of Classification Search
USPC .................. 705/4, 39, 38, 2, 3, 41; 709/217; 715/208; 345/581; 707/748
See application file for complete search history.

(56) References Cited

U.S. PATENT DOCUMENTS

| | | | |
|---|---|---|---|
| 5,752,237 A | 5/1998 | Cherny | |
| 5,852,808 A | 12/1998 | Cherny | |
| 7,430,516 B1 * | 9/2008 | Blair | G06Q 40/00 705/35 |
| 7,769,609 B1 * | 8/2010 | Woll | G06Q 40/08 705/4 |
| 8,428,971 B2 | 4/2013 | Peterie | |
| 8,589,190 B1 | 11/2013 | Pugh et al. | |
| 8,725,541 B2 | 5/2014 | Andrist et al. | |
| 8,849,684 B1 | 9/2014 | Kilpatrick et al. | |
| 2002/0194098 A1 * | 12/2002 | Stiff | G06Q 40/02 705/36 R |
| 2004/0143464 A1 * | 7/2004 | Houle | G06Q 10/10 705/4 |

(Continued)

OTHER PUBLICATIONS

Hsin-Tsung Peng, William W. Y. Hsu, Chih-Hung Chen, Feipei Lai, FinancialCloud: Open Cloud Framework of Derivative Pricing, Sep. 1, 2013, 2013 International Conference on Social Computing (pp. 782-789). (Year: 2013).*

*Primary Examiner* — Tien C Nguyen
(74) *Attorney, Agent, or Firm* — Howard IP Law Group, PC

(57) ABSTRACT

Systems, methods, apparatus, computer program code and means to improve dynamic data processing associated with one or more automated rating applications are provided. In some embodiments, an apparatus may include a communication device to receive a business type and a business location. The apparatus may also include a business owner's policy coverage or standalone general liability coverage platform to query a rating database, the query resulting in at least a first price for an entity. The apparatus may further include a professional liability coverage platform operating in parallel with a business owner's platform.

22 Claims, 16 Drawing Sheets

(56) References Cited

U.S. PATENT DOCUMENTS

| | | | |
|---|---|---|---|
| 2005/0171885 A1* | 8/2005 | Christman | G06Q 40/06 705/36 R |
| 2006/0100912 A1* | 5/2006 | Kumar | G06Q 40/08 705/4 |
| 2008/0126139 A1* | 5/2008 | Prendergast | G06Q 40/00 705/4 |
| 2011/0066454 A1* | 3/2011 | Rosauer | G06N 5/022 705/4 |
| 2012/0072242 A1 | 3/2012 | Fiori et al. | |
| 2012/0203577 A1 | 8/2012 | Faupel et al. | |
| 2013/0332204 A1 | 12/2013 | Fiori et al. | |
| 2014/0074519 A1 | 3/2014 | Pugh et al. | |

* cited by examiner

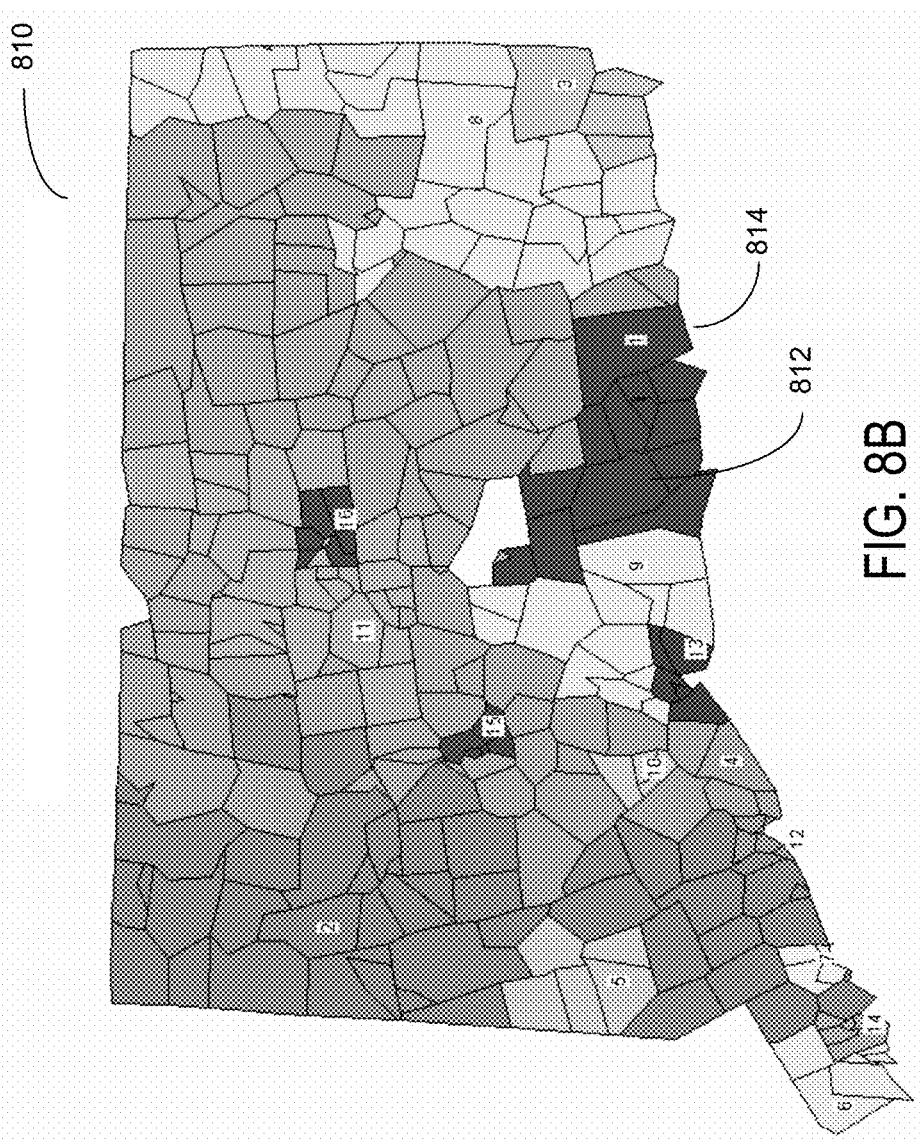

900

| ZIP Code | Exposures in ZIP Code | Smoothed Data (Classifier) | Neighbors | | | | | |
|---|---|---|---|---|---|---|---|---|
| 6390 | 26.48 | 29.69 | | | | | | |
| 10001 | 636.85 | 366.44 | 10010 | 10011 | 10016 | 10018 | | |
| 10002 | 44.78 | 323.56 | 10003 | 10009 | 10010 | 10012 | 10013 | 10038 |
| 10003 | 293.40 | 240.79 | 10002 | 10009 | 10010 | 10011 | 10012 | |
| 10004 | 161.62 | 147.70 | 10005 | 10006 | 10038 | 10280 | | |
| 10005 | 140.35 | 168.10 | 10004 | 10006 | 10038 | | | |
| 10006 | 54.69 | 179.40 | 10004 | 10005 | 10007 | 10038 | 10280 | |
| 10007 | 87.99 | 208.09 | 10006 | 10013 | 10038 | 10280 | | |
| 10009 | 24.73 | 271.25 | 10002 | 10003 | 10010 | | | |
| 10010 | 361.45 | 285.25 | 10001 | 10002 | 10003 | 10009 | 10011 | 10016 |
| 10011 | 481.42 | 259.12 | 10001 | 10003 | 10010 | 10012 | 10014 | |
| 10012 | 296.02 | 341.29 | 10002 | 10003 | 10011 | 10013 | 10014 | |
| 10013 | 280.24 | 338.81 | 10002 | 10007 | 10012 | 10014 | 10038 | |
| 10014 | 126.23 | 293.06 | 10011 | 10012 | 10013 | | | |
| 10016 | 612.74 | 363.72 | 10001 | 10010 | 10017 | 10018 | | |
| 10017 | 660.10 | 180.16 | 10016 | 10018 | 10020 | 10022 | 10038 | |
| 10018 | 434.36 | 177.17 | 10001 | 10016 | 10017 | 10019 | 10038 | |

FIG. 9

| POLICY ID 1302 | PRICE OF BUSINESS OWNER'S POLICY COVERAGE 1304 | PRODUCT FEATURE 1306 | PRICE OF PROFESSIONAL LIABILITY COVERAGE 1308 | CLAIMS 1310 |
| --- | --- | --- | --- | --- |
| P_10001 (ZIP 06840) | $A | COVERAGE LIMIT | $X | C_101; C_102 |
| P_10002 (ZIP 06877) | $B | DEDUCTIBLE | $Y | NONE |
| P_10003 (ZIP 06840) | $C | COVERAGE LIMIT | $Z | NONE |

FIG. 13

SYSTEM FOR IMPROVED NETWORK DATA PROCESSING

BACKGROUND

Data driven businesses increasingly are dependent on a wider variety and amount of data derived or accessed from multiple disparate sources and networks. Significant challenges exist with integrating complex and sophisticated information technology solutions in order to perform large-scale transactional data management while maintaining data quality and access. Advanced intelligence and analytics are needed to help businesses understand and make use of complex data for effective and reliable decision making.

Small and medium size businesses span a wide range of business types, and involve a wide range of business risks and risk characteristics, making it difficult to generate and analyze information to produce rating and pricing policies that can be reliably and consistently applied to different businesses in different geographical locations.

The rating and pricing of business owner's policies is complex, and is made particularly complex by the wide range of different types and classes of businesses. Rating and pricing is made even more complex by the different geographical, demographic and even environmental conditions that are relevant to the risk of loss for different businesses. For example, certain areas of the U.S. present higher loss risks due to catastrophic conditions such as hurricanes or floods. As another example, certain areas present higher loss risks due to theft. Current rating and pricing systems do not adequately take such territorial variations into consideration when pricing and evaluating business owner's policies.

In addition to business owner's policy coverage, certain types of businesses may be interested in professional liability insurance. For example, a professional public speaker might be interest in obtaining insurance against the risk being accused of making slanderous or libelous statements. Similarly, an accounting or auditing service might be interested in obtaining insurance again the risk of being accused of misconduct. Different types of businesses, however, can be associated with different types of professional liability risks, and determining an appropriate premium value for such insurance can be a time consuming task (especially when underwriting determinations are not begun until after the business owner's policy coverage is calculated).

It would be desirable to provide systems and methods for rating and pricing insurance policies which achieve faster, better rate and pricing specificity and flexibility. It would further be desirable to provide established base rates by coverage, amount of insurance relativities, territories or geographical location. It would be further desirable to provide systems and methods that allow existing agent systems and processes to quickly and efficiently price and quote business owner insurance policies, including professional liability coverage, using the improved rating and pricing systems.

SUMMARY OF THE INVENTION

According to some embodiments, systems, methods, apparatus, computer program code and means for rating and pricing insurance policies are provided. In some embodiments, to improve processing associated with a dynamic automated rating application may include a communication device to receive, from a remote device via a communication network, information associated with a business to be insured including a quote request for the business specifying a business type and a business location. The apparatus may also include a business owner's policy coverage or standalone general liability coverage platform coupled to the communication device, including a first processor coupled to the communication device and a first storage device in communication with the first processor and storing instructions adapted to be executed by the processor to: (i) identify at least a first applicable business owner's policy coverage or standalone general liability coverage, (ii) based on the at least a first applicable business owner's policy coverage or standalone general liability coverage, identify at least a first relevant coverage formula including at least a first territory factor, the at least a first territory factor based on a geographical location of the business, and (iii) query a rating database using the at least a first relevant coverage formula, the business type and the business location, the query resulting in at least a first price for the at least first applicable business owner's policy coverage. The apparatus may further include a professional liability coverage platform coupled to the communication device, operating in parallel with the business owner's policy coverage platform and including a second processor and a second storage device in communication with the second processor and storing instructions adapted to be executed by the processor to: (i) based on the business type, modify a base professional liability form with at least one product feature, and (ii) query a professional liability rating database using the business type, business location, and the at least one product feature, the query resulting in a professional liability premium value, wherein the apparatus is to transmit a response to the quote request, the response including the at least a first price, the at least first applicable coverage, and the professional liability premium value.

According to some embodiments, a quoting process using the rating sheets generated pursuant to some embodiments includes receiving a quote request associated with a business, the quote request specifying a business type and a business location, identifying at least first applicable coverage, based on said at least first applicable coverage, identifying at least a first relevant coverage formula, querying a rating database using said at least first relevant coverage formula, said business type and said business location, said query resulting in at least a first price for said at least first applicable coverage, and transmitting a response to said quote request, said response including said at least first price and said at least first applicable coverage.

Other embodiments include: means for receiving, from a remote device via a communication network, information associated with a business to be insured including a quote request for the business specifying a business type and a business location; means for identifying at least a first applicable business owner's policy coverage or standalone general liability coverage; based on the at least a first applicable business owner's policy coverage, means for identifying at least a first relevant coverage formula including at least a first territory factor, the at least a first territory factor based on a geographical location of the business; means for querying a rating database using the at least a first relevant coverage formula, the business type and the business location, the query resulting in at least a first price for the at least first applicable business owner's policy coverage; based on the business type, means for modifying a base professional liability form with at least one product feature; means for querying a professional liability rating database using the business type, business location, and the at least one product feature, the query resulting in a professional liability premium value means for transmitting a response to the quote request, the response including the at least a first price, the at least first applicable coverage, and the professional liability premium value.

In some embodiments, a communication device associated with an automated insurance processing platform exchanges information with remote devices. The information may be exchanged, for example, via public and/or proprietary communication networks.

A technical effect of some embodiments of the invention is an improved and computerized insurance rating and quoting system providing faster, better rate and pricing specificity and flexibility for business insurance policies. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 8A and 8B illustrate graphical depictions of portions of territory maps in accordance with some embodiments of the present invention.

FIG. 9 illustrates an input data table used in selecting territory groupings according to some embodiments of the present invention.

FIG. 13 is a portion of a tabular database storing insurance information in accordance with some embodiments.

DETAILED DESCRIPTION

The present invention provides significant technical improvements to facilitate dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the areas of parallel rating applications by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client, and/or third party systems, networks and subsystems. For example, in the present invention information may be transmitted from remote devices to the rating applications and may then be analyzed accurately, in parallel to improve response times, and automatically collected by an enterprise.

Figure 1:
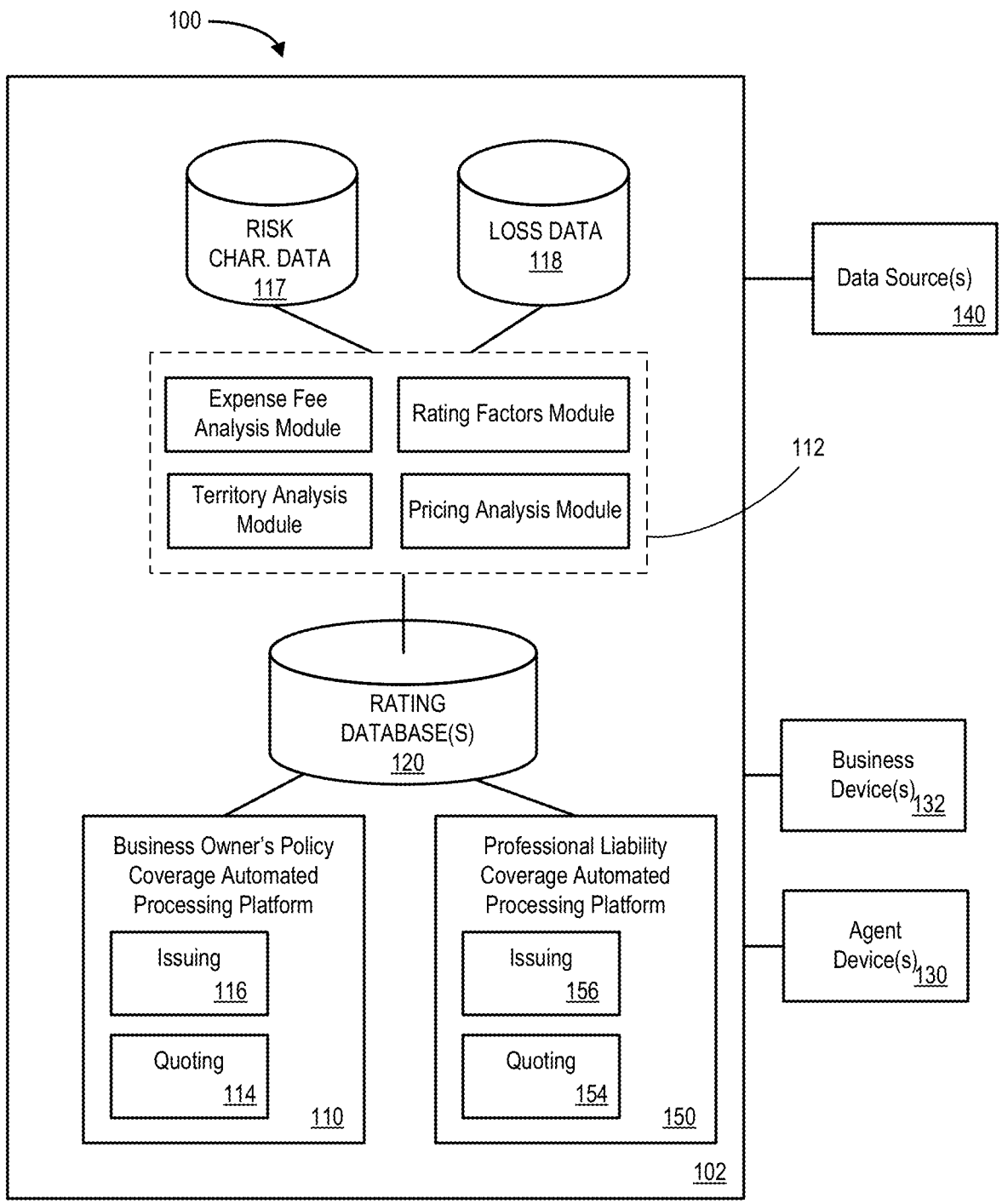
FIG. 1 is block diagram of a system according to some embodiments of the present invention.

FIG. 1 is block diagram of an insurance system 100 according to some embodiments of the present invention. The system 100 may, for example, facilitate the creation of rating schedules for business insurance policies as well as perform the quoting, rating and pricing of individual policies, including "professional liability insurance," using those rating schedules. As used herein, the phrase "professional liability insurance," also known as error and omissions insurance, may refer to liability insurance that helps protect entities from paying defense and/or indemnity costs relating to a claim made by a client alleging an actual or alleged negligent act, error or omission in the performance of or failure to perform professional services. Note that professional liability insurance may be associated with Miscellaneous Professional Liability ("MPL") insurance and/or Accountant Professional Liability ("APL") insurance.

According to some embodiments, a business owner's policy coverage "automated" insurance processing platform 110 may be provided. As used herein the term "automated" indicates that at least some part of a step associated with a process or service is performed with little or no human intervention. By way of examples only, the platform 110 may be associated and/or communicate with a Personal Computer (PC), an enterprise server, a database farm, and/or a consumer device. The business owner's policy coverage automated insurance processing platform 110 may, according to some embodiments, apply rating schedules, and price and rate individual business policies using those rating schedules. Pursuant to some embodiments, the rating schedules include one or more territory factors used to incorporate geographical, demographic and territorial loss data into the rating and pricing of policies.

As shown, the business owner's policy coverage automated insurance processing platform 110 may include a number of modules or components, including one or more analysis modules 112, quoting modules 114 and issuing modules 116. As will be described further below, the analysis modules 112 may be used in conjunction with the creation and updating of one or more rating schedules for use in pricing and rating business insurance policies pursuant to embodiments of the present invention. For example, in some embodiments, the analysis modules 112 are used to analyze historical loss data in conjunction with geographic and demographic data to generate territory factors for use in rating and pricing business insurance policies. In some embodiments, as will be described further below, the territory factors are used in conjunction with one or more rating formulas to allow improved pricing and analysis of business insurance policies. The analysis modules 112 may include code or other modules used to analyze and generate expense fees, analyze and create rating factors, analyze and create territory factors, and perform pricing analysis. The analysis modules 112 may be operated to create data for storage and use in one or more rating databases 120. The data stored in rating databases 120 are accessed by the business owner's policy coverage automated processing platform 110 to allow quoting and issuing of policies using the ratings data.

A professional liability coverage automated insurance processing platform 150 may include a number of modules or components, including one or more analysis modules, quoting modules 154 and issuing modules 156. As will be described further below, the analysis modules 112 may be used in conjunction with the creation and updating of one or more rating schedules for use in pricing and rating professional liability insurance policies pursuant to embodiments of the present invention. For example, in some embodiments, quoting module 154 is used to modify a base professional liability form with at least one product feature (e.g., a deductible amount, coverage limit, etc.). Note that a base professional liability form may, according to some embodiments, be modified by one mandatory class-specific endorsement. In some embodiments, as will be described further below, the professional liability coverage automated insurance processing platform 150 operates in parallel with the business owner's policy coverage automated processing platform 110 to determine a professional liability premium value for a quote. The quoting module 154 may include code or other modules used to analyze and generate expense fees, analyze and create rating factors, analyze and create territory factors, and perform pricing analysis. The analysis modules may be operated to create data for storage and use in one or more rating databases 120. The data stored in rating databases 120 may be accessed by the professional liability automated processing platform 150 to allow quoting and issuing of policies using the ratings data.

The quoting modules 114, 154 may be used in conjunction with the quoting, rating and pricing of individual business insurance policies (e.g., in response to requests for quotes received from agents operating agent devices 130 or business devices 132).

The business owner's policy coverage automated insurance processing platform 110 and the analysis modules 112 may access information in one or more databases 117-118. The databases may include, for example, risk characteristic data 117 and historical loss data 118 associated with previously-issued insurance policies. As will be described further below, the risk characteristic data 117 and the historical loss data 118 may be used by the analysis modules 112 in the creation and updating of rating schedules for the storage in one or more rating databases 120 for use by the business owner's policy coverage processing platform 110 in quoting, pricing and issuing new business insurance policies.

The business owner's policy coverage automated insurance processing platform 110 and the analysis modules 112 may also have access to data from one or more external data sources 140. The external data sources 140 may include data used, for example, by the analysis modules 112 in the analysis and generation of rating tables. For example, external data sources 140 providing demographic, geographic, and climate data may be accessed by the business owner's policy coverage automated insurance processing platform 110. In some embodiments, the external data sources 140 may include publicly accessible data (e.g., such as U.S. ZIP code data and U.S. census data).

The business owner's policy coverage automated insurance processing platform 110 might access the databases 117-120 and the external data sources 140 via one or more communication networks. These devices (and any of the other devices described herein) could be associated with, for example, a server, a PC, a mobile or laptop computer, or any other appropriate storage and/or communication device to exchange information via a web site and/or a communication network. As used herein, devices (including those associated with the business owner's policy coverage automated insurance processing platform 110, the databases 117-120, the external data sources 140, the agent devices 130, business devices 132, and any other device described herein) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks. According to some embodiments, one or more business devices may be associated with a claims processing system adapted to receive information about a claim, determine Extended Reporting Period ("ERP") information associated with the claim, and provide claim data to an automated dynamic rating application.

The business owner's policy coverage automated insurance processing platform 110 and/or databases 117-120 may be, according to some embodiments, accessible via a Graphical User Interface (GUI). The GUI might be used, for example, to dynamically display existing insurance policy information, analyze historical or demographic data to generate territory factors for use in rating formulas, generate updated or new rating tables, receive requests for business insurance policy information, and/or to associate one or more cost of insurance rates with an existing or proposed policy.

Although single automated insurance processing platforms 110, 150 are shown in FIG. 1, any number of such devices may be included. Moreover, various devices described herein might be combined according to embodiments of the present invention. For example, in some embodiments, the business owner's policy coverage automated insurance processing platform 110 and databases 117-120 might be co-located and/or may comprise a single apparatus. In some embodiments, the analysis modules 112, and the analysis and generation of ratings factors (such as the territory rating factors described below) is performed using one or more separate systems. In some embodiments, some or all of the analysis may be performed using a spreadsheet or other analytic program.

Figure 2:
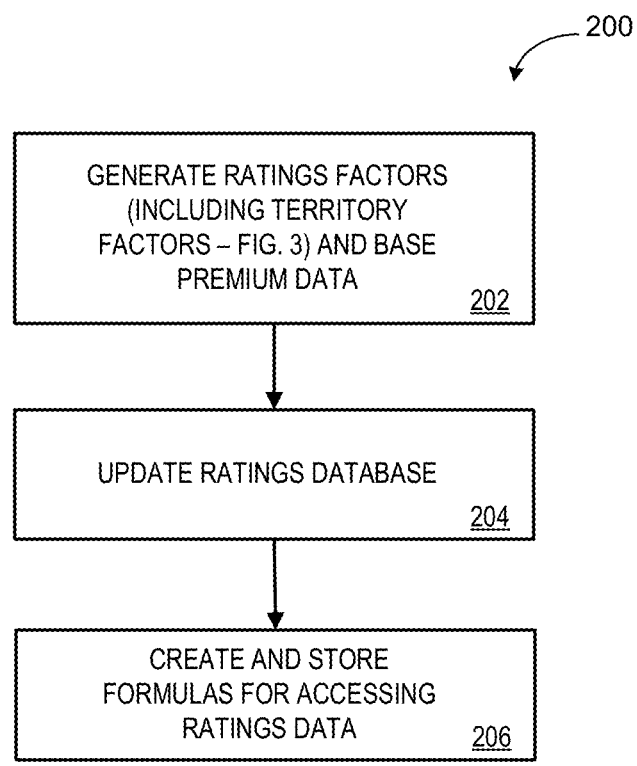
FIG. 2 illustrates a method according to some embodiments of the present invention.

FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 may be performed to generate (or update) a ratings database to allow the quoting, pricing and issuance of business insurance policies using features of the present invention. Pursuant to some embodiments, process 200 involves processing at 202 where ratings factors (including territory factors) and base premium amounts are calculated and generated, processing at 204 where the ratings database is updated with those factors and premiums, and processing at 206 where a set of formulas is created and stored for use in accessing the ratings data for use in the pricing of business insurance policies. In some embodiments, process 200 may be used to create ratings data for each regulated territory or region. As a specific example, where the process 200 is used to create ratings data for a State in the United States, process 200 is performed on a State-by-State basis to produce ratings data and formulas for the issuance and quoting of policies in a single State. As will be discussed further below, the individual ZIP codes within a State are analyzed to create territory factors for rating insurance policies within the State.

According to some embodiments, the creation of a ratings database involves the generation of a number of rating factors and premiums. For example, to allow the calculation of a property liability insurance premium for a business, the following rating factors may be generated and stored in the ratings database: market group factors, class factors, amount of insurance factors, protection class factors, construction class factors, building age factors, number of locations factors, etc. Some of these factors may be created using traditional techniques used in the art. Pursuant to some embodiments, additional factors, referred to herein as territory factors, are provided which are created using techniques of the present invention. These territory factors allow more accurate and predictive pricing of business insurance premiums, and may be created using the process described below in conjunction with FIG. 3.

Process 200 results in the generation of ratings data (or tables) which may be accessed or used in the pricing of business insurance applications using a set of formulas selected based on a policy type. For example, an application for a property liability insurance policy may result in the execution of a building rating formula which retrieves data from ratings database. An example of a portion of a building rating formula is: Calculated Premium=[Base Premium]*[Market Group Factor]*[Class Factor]*[Territory Factor].

In the sample building rating formula shown above, each of the variables (contained in brackets) are retrieved from the ratings database (such as the database 120 of FIG. 1) based on information stored in the ratings database in process 200. Those skilled in the art, upon reading this disclosure, will appreciate that a number of different types of rating formulas may be used. For example, the system 100 may use some or all of the following rating formulas to access ratings data from ratings database 120 to price business insurance policies: a building rating formula, a business personal property rating formula, a personal property of others rating formula, products rating formulas, PREM/OPS rating formulas, business interruption ratings formulas, an equipment breakdown rating formula, a policy expense fee rating formula, and one or more optional coverage rating formulas.

Some or all of the steps of process 200 may be repeated as needed (e.g., on a regular or scheduled basis) to ensure that the ratings data is up-to-date and accurately reflects risk and pricing conditions, and to ensure that appropriate and relevant formulas are used in the operation of the system.

Applicants have recognized that territory or geographical conditions may be used to improve the pricing and analysis of business insurance policies. The generation, smoothing and use of territory factors pursuant to some embodiments will now be described by reference to FIG. 3. Pursuant to some embodiments, a set of territories (or geographical regions) are created which are assigned a territory rating factor for use in the ratings database 120 of FIG. 1. In some embodiments, the set of territories is based on ZIP codes within a State being analyzed. As will be described further below, groups or sets of ZIP codes having similar characteristics are grouped together and assigned similar territory factors. The number of ZIP codes within a grouping or set is selected to improve the predictive power and to reduce statistical noise, as well as to increase the perceived or actual fairness of ratings within a geographical region. Pursuant to some embodiments, the territorial data used in generating the territory factors is generated using an analysis of geographic (ZIP code), demographic, and other data. Pursuant to some embodiments, a set of rating boundaries is created by State (or other geographic region). In one embodiment, the rating boundaries are based on ZIP code regions and encompass contiguous geographic areas. Those skilled the art will appreciate that other boundary regions may also be used.

In some embodiments, a result of the territory analysis is a set of territory factors (for use in rating formulas, and stored in a rating database or table) with a set of territories having territory boundaries. In some embodiments, the same territory boundaries will apply to all classes of businesses (e.g., the same territory will be used to identify the rating information for a manufacturing business as well as a retail business). Pursuant to some embodiments, historical loss data is analyzed (by ZIP code, for example) to determine a set of boundaries having reliably grouped ZIP codes with the most similar risk of loss within a territory. The analysis, in some embodiments, attempts to identify the greatest differences between territories (e.g., so that the most similar risk of losses are within the same territories).

Pursuant to some embodiments, separate territory factors may be generated for liability insurance, property insurance, and insurance based on catastrophe-related losses (such as floods, hurricanes, etc.). In such embodiments, separate ratings tables, with separate territory factors, may be created and stored in ratings database 120 for access by the quoting module 114 in the quoting and pricing of new policies. The territory factors may be generated using a process such as the process described below in conjunction with FIGS. 3A and 3B.

Figure 3A:
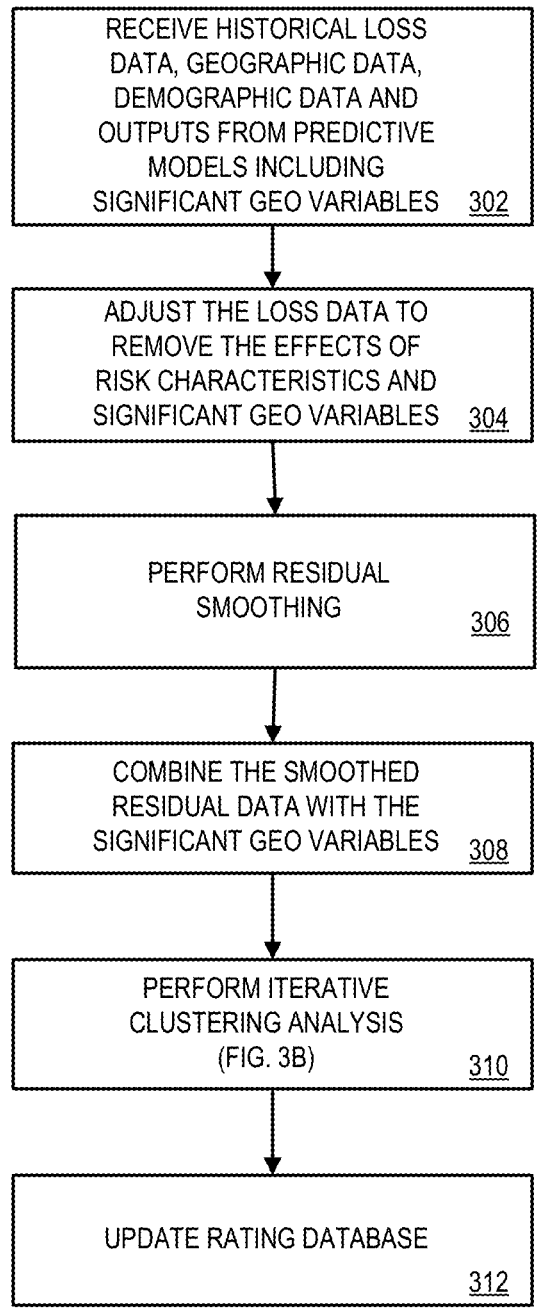
FIGS. 3A and 3B illustrate a further method according to some embodiments of the present invention.

The processing of FIG. 3A begins at 302 where the automated processing platform 102 receives (or otherwise obtains) historical loss data (e.g., from database 118), geographic data (e.g., from external data source 140) and demographic data (e.g., from external data source 140) for analysis. Data received at 302, in some embodiments, also includes outputs from predictive models (e.g., such as generalized linear models, or "GLMS") which are run to predict the statistical likelihood of future claims or losses based on past data (such as the historical loss data). GLMS may be used to predict claim frequency, claim severity or pure premium. The historical loss data may be segmented into both frequency of loss and severity of loss data. The frequency and severity data, in some embodiments, may be obtained from historical loss data and may be supplemented using external data.

For example, the following external demographic, geographic, and climate data may be used to supplement historical property coverage information: population and population density data, percentage of population married, percentage of population with college education, percentage of population using public transportation, percentage of buildings built before a certain date (e.g., such as 1960), crime rate, weather data, including rainfall, snowfall, and temperature data. This external demographic, geographic and climate data may be obtained, for example, from a number of publicly available data sources. Pursuant to some embodiments, the territory data is based on U.S. ZIP code data (although data from other sources or regions may also be used).

The outputs from the predictive models may further include data identifying one or more significant geo variables which are identified to reduce the geographical or demographic influence on claim or loss data. For example, there are more thefts where the crime rate is high and more slip and fall claims occur where population density is highest and/or sidewalks are icy. Other significant geo variables may include the percentage of businesses in a ZIP code making a claim, the crime rate in a ZIP code, or the like. The significant geo variables may be based on ZIP codes within a territory or region being analyzed (e.g., such as a State). The GLMS may also be operated to perform an analysis of the frequency and severity of historical loss data by coverage type (e.g., where "coverage type" may include property coverage or "PREM/OPS" coverage), by peril of loss for property coverage (e.g., where perils include theft, fire, water, non-hurricane wind, hurricane wind, and other), and by type of exposure base for PREM/OPS coverage (such as sales numbers, payroll size, and property square footage).

Processing continues at 304 where the loss data received at 302 is adjusted to remove the effects of risk characteristics and the significant geo variables. That is, processing at 304 includes removing certain variables having an impact on the loss data which are associated with geographic and other variables.

Processing continues at 306 where the dataset created at 304 is processed using a residual smoothing procedure to account for known variables and remove items not driven by generic risk characteristics on a geographic basis. This smoothing process is performed by territory (e.g., by State). For example, in some embodiments, processing at 306 includes generating exposure data by ZIP code, and then performing a residual smoothing process on the exposure data to improve the data (e.g., by removing residual or statistical noise) for further analysis. In some embodiments, an algorithm such as the following formula, may be used, although those skilled in the art, upon reading this disclosure, will recognize that other formulas may be used:

$$S_i = \sum_{d_j \leq z} \frac{U_j}{d_j^y}$$

Where the smoothed Si is the sum of all the unsmoothed $U_j$'s divided by dj (the distance from ZIP code (i) to ZIP code (j)) with parameters y and z. The formula may be applied for a series of ZIP codes from (i) to (j), where $U_i$ is a loss cost or risk characteristic in a ZIP code area (i). By performing this smoothing on the loss data associated with each ZIP code, a smoothed data set is produced with noise or other anomalies removed. The smoothed data set is then combined with the significant geo variables (that were removed at 304) at 308.

Processing continues at 310 where an iterative clustering analysis is performed on the data created at 308. In general, processing at 310 involves iteratively grouping or clustering the ZIP code data for the State or region being analyzed to produce groups of ZIP codes that have similar loss or exposure characteristics. By grouping ZIP codes in this manner, a reduced number of potential territories are created which provide improved pricing and analysis of business insurance policies. Applicants have recognized that a number of benefits arise from such groupings. For example, processing overhead is reduced by having fewer territories. As another example, confusion in pricing is avoided. As a specific example, if territories were not grouped pursuant to the present invention, situations may arise where a business in one ZIP code area may enjoy a low premium, while a similar business in a second ZIP code (which may be geographically very near the first ZIP code) receives a second premium, different than the first premium. Such pricing discontinuities may be difficult to explain and may not accurately represent the exposure difference.

Figure 3B:
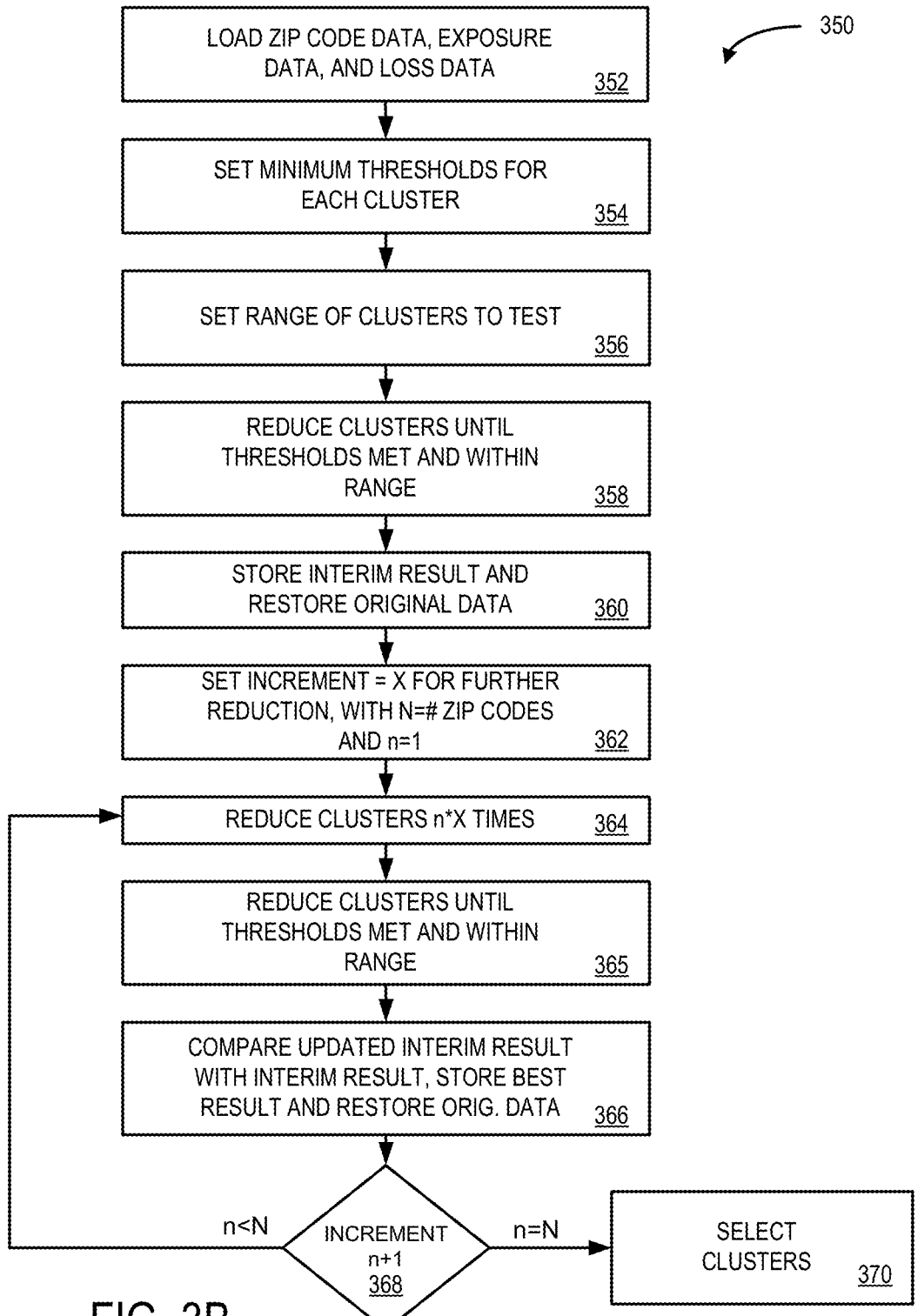
Figure 10:
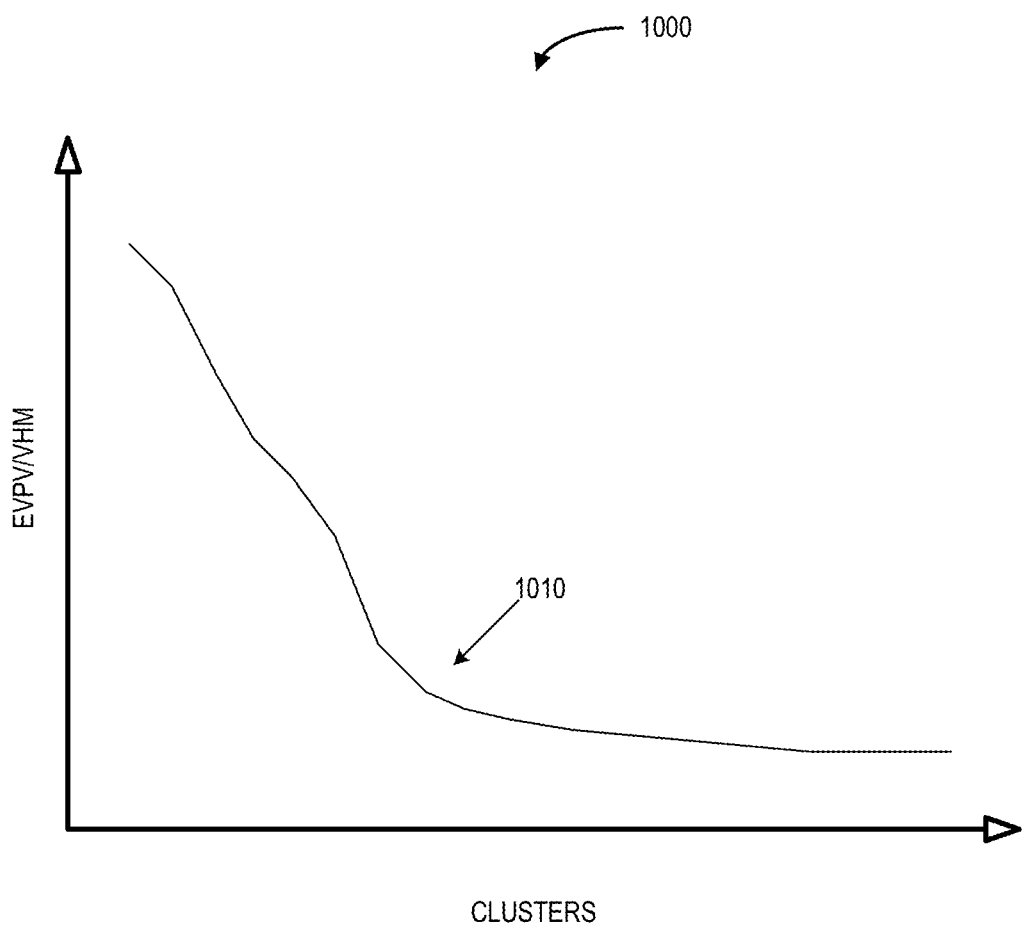
FIG. 10 illustrates a chart for analyzing territory groupings in accordance with some embodiments of the present invention.

Pursuant to some embodiments, the creation and selection of territory groupings is performed in an iterative process as shown in FIG. 3B. For example, the geographical, demographic and loss data may be analyzed in multiple scenarios, with each scenario involving a different grouping of ZIP codes. Each scenario may include a different sized grouping of territories, ranging from about 5 territories to fifty or more territories. Each scenario is then analyzed to determine the appropriate sized grouping. For example, the most appropriate sized grouping may be one having sufficient predictive power (e.g., which could occur when too few territory groups are used) and less statistical noise (e.g., which could occur when too many territory groups are used). One process for grouping territories will now be described by reference to FIG. 3B in conjunction with FIGS. 9 and 10.

The process of FIG. 3B begins at 352 with the loading of ZIP code data, exposure data and loss data (e.g., from FIG. 3A, step 308). FIG. 9 is a table 900 showing a part of an input data set that may be used in the iterative clustering analysis and represents some of the input data loaded at 352. The table 900 includes a number of columns (including a ZIP code column, an exposures in ZIP code column, a smoothed data exposures column, and a set of one or more ZIP code neighbors columns). The data in the ZIP code column may include all ZIP codes for a State or other region that is being analyzed, and may be obtained from one or more public data sources. The data in the exposures columns may be obtained from historical loss data sources (e.g., such as historical loss database 118 of FIG. 1), and the smoothed data may be the data generated at step 308. The ZIP code neighbors are those ZIP codes that are geographically next to the ZIP code in the first column of the table, and may be obtained from public data sources.

The data in the table 900 is analyzed to generate clusters, or groups of territories. As an initial matter, a range of ZIP code clusters may be selected for testing and grouping. The range of clusters to be tested is set at step 356 of FIG. 3B. The size of the range may be based on the size of the State or region being analyzed. For example, a range of 5-40 ZIP codes may be used. The analysis then proceeds in two or more iterations.

Process 350 continues with a first clustering iteration at 358. The first clustering iteration proceeds as follows. First, the input data (from table 900) is loaded into an analysis macro or tool, and a minimum threshold exposure for each cluster and a minimum number of ZIP codes is selected. For example, a minimum exposure of 2% and a minimum number of 10 ZIP codes may be selected. Next, a copy of the data from table 900 is made, and each ZIP code is marked, flagged, or otherwise designated as a "cluster". Next, the data is reduced by merging (e.g., one at a time) the two most similar neighboring clusters that are neighbors where at least one is in a cluster that does not meet at least one of the minimums set above. This continues until all of the clusters meet the minimums set at 354. The first iteration continues by reducing the two most similar neighboring clusters (one at a time) until the cluster count is within the input range of clusters to be tested. The output of this iteration is stored in memory, and the second iteration is performed. To "reduce" the most similar neighboring clusters, a reduction algorithm may be performed which adds two cluster exposure amounts together, weights two cluster average loss costs together using exposure data, and then combines two distinct cluster neighbors. The result of this first iteration are stored as an interim result at 360, and the original data (from 352) is restored for further processing.

Processing continues at 362 where an increment is established (shown as "X" in FIG. 3B). The increment, for example, may be set as "3" (where the clusters will be reduced 3 times). Several other processing variables may also be set at 362. For example, a variable such as "N" may be set to equal the total number of ZIP codes to be processed (or, the total number of ZIP code areas in the State being analyzed). A counter variable (shown as "n") may also be set to 1.

Processing continues at 364 where the clusters are reduced in a subsequent iteration to reduce the clusters by the set increment (in a first iteration, the clusters are reduced n*X times, or 1*3 times in the example). Each subsequent iteration begins with the original data (e.g., the data from table 900). In performing the subsequent iteration, the set increment is used (in the example, the increment is set as 3, so the total number of ZIP codes in the State is divided by 3). Each of the ZIP codes in the table 900 is set as a cluster, and n*X clusters should be reduced by merging (one at a time) the two most similar neighboring clusters without regard to the minimums set forth in 354. The data is then reduced by merging (one at a time) the two most similar neighboring clusters where at least one is in a cluster that does not meet at least one of the minimums set in 354. This continues until the cluster count is within the input range of clusters to be tested. Once the input range is reached, the output of the first iteration (stored at 360) is compared to the output of the subsequent iteration (at 366) to determine which output is more desirable, and the selected output is stored as the currently preferred set.

The reduction may continue until n=N (that is, the reduction at 365 may be repeated N/X times). Each iteration results in the storage of interim results and the comparison to the previous "best" clustering at 366 until the best clustering from the different iterations is obtained. At the end of each iteration, the original data is restored for use by the subsequent iteration. The best clustering may be stored in spreadsheet for further analysis and approval by an administrator.

Further analysis and approval of the clustering may be performed by dividing an Expected Value of Process Variance ("EVPV") by a Variance of Hypothetical Mean ("VHM") as well as the number of ZIP codes in the largest cluster to determine the number of clusters to use. In general, the EVPV/VHM is larger when variance within a cluster is larger and when variance between clusters is larger. This is shown graphically in FIG. 10, where a chart 1000 is shown. The chart 1000 represents hypothetical EVPV/VHM values plotted against a number of clusters. As shown, there exists a point 1010 at which the value of increasing clusters diminishes. In some embodiments, the number of clusters to select for territory factors in this example is the number of clusters at point 1010. Selecting more clusters than this would result in unnecessary complexity, selecting fewer clusters may result in territory groups with reduced accuracy.

Once a desired "clustering" of territories has been achieved, processing may continue at step 312 of FIG. 3A, where the territories may be assigned rating factors and loaded into the ratings database 120 for use in rating and pricing policies. By grouping contiguous or geographically proximate territories having similar loss characteristics, Applicants achieve improved pricing and reduced complexity. Illustrative examples of territory maps are shown in FIG. 8A (which shows smoothed output, e.g., such as the output from step 308 of FIG. 3A) and FIG. 8B (which shows contiguous or clustered territories, e.g., such as the output from step 310 of FIG. 3A).

Figure 8A:
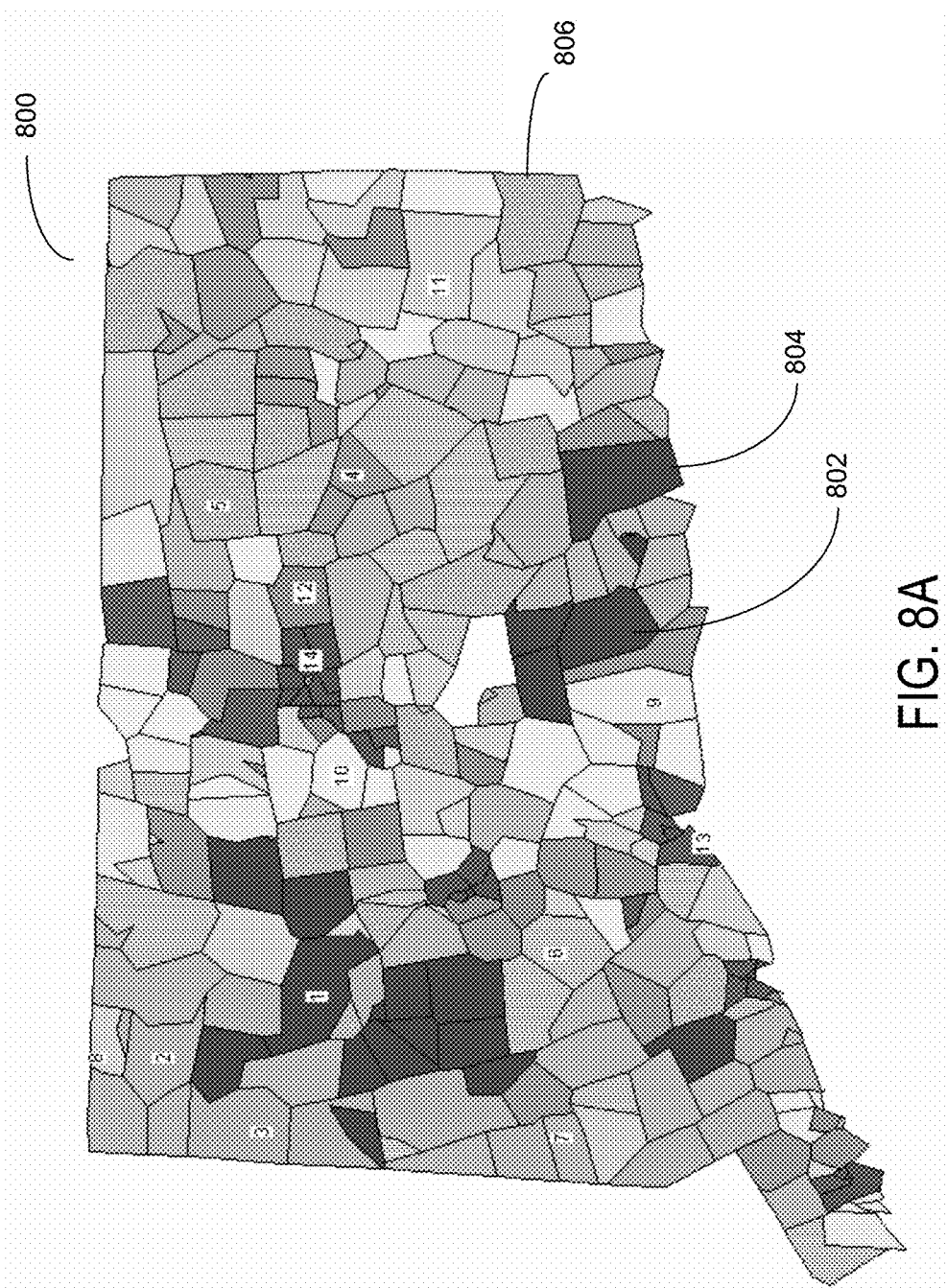

FIG. 8A is a graphical representation of a territory map for the State of Connecticut. A number of sub-territories are shown, corresponding to ZIP code areas established by the U.S. Postal Service. As shown, each ZIP code area is shaded with a color representing a loss risk associated with historical loss data from that ZIP code area. The map 800 is the result of the smoothing process described above as step 308 of FIG. 3A. The sub-territories (or ZIP code areas) with similar shading have similar loss risks and other characteristics (e.g., such as the ZIP code areas marked as items 802 and 804), while other sub-territories or ZIP code areas have different loss risks and characteristics (e.g., such as the ZIP code area marked as item 806). FIG. 8B is a similar graphical representation of a territory map for the State of Connecticut. However, in FIG. 8B, the rating zones have been clustered such that contiguous regions are shown. The contiguous regions represent the clustering described above (in FIG. 3B) and the map 810 represents the output that may exist at step 310 of FIG. 3A, such that ZIP code areas having similar loss characteristics are grouped together. For example, the ZIP code areas identified as items 812 and 814 correspond to the same ZIP code areas in FIG. 8A (items 802 and 804), but are now shaded the same color (indicating that the ZIP code areas 812 and 814 have been assigned the same territory risk factor). That is, areas 812 and 814, as a result of the analysis of the present invention, have been identified as having similar loss characteristics, such that insurance policies issued to entities in those ZIP code areas will be priced using the same territory risk factor. As shown in FIG. 8B, the numerous ZIP code areas in Connecticut have been reduced to clusters or contiguous zones, where each ZIP code area in a cluster is assigned the same territory risk factor.

Each type of coverage (e.g., property hurricane, property non-hurricane, and PREM/OPS) may have a separate territory map and may have separate territory rating factors. Pursuant to some embodiments, these territory maps help to visually depict how the boundaries can make sense compared to the risk related data that resulted in their development. For example, there will be more territories in large cities with high population and crime rates. Unique territories could also exist because of different temperature and/or rainfall patterns. By aligning rating areas with territorial regions, Applicants have discovered that demographic and other data may be reliably analyzed (in conjunction with historical loss data) to create rating tables that more closely match the loss risks associated with businesses in those territories. The result is an ability to quickly and accurately generate pricing data for business insurance policies, given a business location. Business owners enjoy more accurate pricing of policies, with many business owners enjoying lower rates based on this greater accuracy.

Pursuant to some embodiments, the process of FIG. 3 may include some further review and analysis of the territory boundaries. For example, in some embodiments, further review may include human review (e.g., by field office staff or the like) to determine whether fewer or additional boundaries might be needed to align with local knowledge or other considerations. Once the further review and analysis is complete, the territory boundaries and definitions and associated territory rating factors may be finalized for production use in rating prospective business insurance policies. The processing at 312 may include updating the rating database to include territory rating factors for each coverage type and territory set may be generated. For example, territory rating factors may be generated for each U.S. State in which the business insurance policies are to be issued. Each territory rating factor may follow the territory breakdown for that State, and territory rating factors may be generated for each coverage type in each territory for the State. A typical rating sheet may include, for example, a number of territories, a number of products, and a number of rating factors.

Pursuant to some embodiments, a series of update and maintenance routines may be performed to ensure that the territory definitions remain accurate. For example, on a regular or as-needed basis, a process may be performed to determine whether any changes to ZIP codes have occurred requiring updates to the territory definitions. As a specific example, in some situations the U.S. Postal Service may revise (e.g., add or remove) ZIP codes. A maintenance process may be performed to identify such changes and to apply the changes to the production territory assignment tables. In some embodiments, the production territory assignment tables may be updated on an annual basis (or with every rate review). In some embodiments, some or all of the steps of process 300 may be performed to update or maintain the rating tables.

Once the rating database has been updated with one or more rating tables, (and rating formulas and rating factors including territory rating factors have been updated as will be discussed below), the processing platform 102 may be accessed by one or more agents operating agent devices 130 to request quotes on business insurance policies using the rating database. Note that business may directly request an insurance quote through a business device 132 (e.g., via a web portal) in accordance with any of the embodiments described herein. A quoting process 400 will now be described by reference to FIG. 4.

The quoting process 400 may be performed using the rating and quoting system 100 of FIG. 1 to rate and quote business insurance policies using features of the present invention. Quoting process 400 begins at 402 where a quote request is received by the processing platform 102. Pursuant to some embodiments, quote requests may be received, for example, from agents operating agent devices 130 (or business devices 140). Agent devices 130 may be computers in communication with processing platform 102 over a network connection. In some embodiments, agent devices 130 may be computers with a Web browser which connect to processing platform 102 via an Internet connection. Agents operating agent devices 130 may enter a number of data elements specifying the characteristics of the business for which they are seeking a business insurance policy quote. For example, the agent may enter data specifying the business name, address, business type, and other information. This information is used by the processing platform 102 to generate a quote using the rating tables created as described above.

Processing continues at 404 where the processing platform 102 analyzes the business information from the quote request to identify one or more applicable coverage(s) for the business. For example, the applicable coverage(s) may depend on factors such as the business type, whether the business owns property, or the like. Once the applicable coverage(s) are identified, processing continues at 406 where one or more relevant formula(s) corresponding to the applicable coverage(s) are identified. As an example, processing at 406 may include identifying one or more of the following formulas as relevant: building coverage, business personal property, personal property of others, products, pre-ops, business interruption, and equipment breakdown. Each of these formulas may be stored at, or otherwise accessible to, the quoting module 114 of platform 110.

Once applicable formulas have been identified, processing continues at 408 where the formula(s) are used to query the rating database 120 to retrieve the premium ratings for the business. For example, in quote request involving a business having a property to be covered, the building coverage formula may be selected at 406, and then applied at 408 to retrieve the current rates for a property having the value specified in the quote request in the territory specified. Each formula may have a number of factors, multipliers and other data look ups required to retrieve and apply the relevant rate from the rating database 120. However, since the rating database 120 and rating formulas include the application of territory factors based on discrete geographical areas, the relevance of each premium corresponds tightly to the data in the quote request, allowing business insurance policies to be quickly and accurately quoted using embodiments of the present invention.

According to some embodiments, professional liability insurance processing may be performed in parallel with the operations described with respect to 404 through 408. For example, at 424 a base professional liability form may be modified, in accordance with a business type, with at least one product feature. At 426, a professional liability database may be queried using the business type, business location, and the product feature. As a result of the query, a professional liability premium may be determined at 428. Because these operations are performed in parallel, the relevant information may be determined in a more timely fashion. Moreover, because the same input information is used by both operations, the chance of errors in the input information may be reduced.

Once all the rating data has been retrieved from the ratings database 120 and applied to the relevant formulas, a quote is constructed at 410. Each quote may involve multiple queries to the ratings database as each quote may involve the application of multiple ratings formulas. In some embodiments, the quote is constructed after all of the ratings formulas have been applied. Once the quote is completed, the quote, including the professional liability premium value, is delivered to the agent device and/or business device at 412. When delivered to the agent device, the agent may then present the quote package to the business owner for review and possible binding.

Embodiments of the present invention simplify the process for generating quotes for business insurance policies by reducing the number of steps and manual lookups typically required by agents. Further, the quotes provided are more accurate and correspond to the nature of the loss risk associated with businesses as the ratings data is constructed from actual historical loss data and other demographic and territorial data.

Note that the process 400 may be repeated until a quote package has been constructed that satisfies the agent and the business owner.

Pursuant to some embodiments, one or more optional coverages (e.g., such as an accounts receivables policy, which may be optionally added by certain qualifying businesses) may also be calculated as a part of the quoting process. For example, in some embodiments, an optional coverage net rating may be calculated. Pursuant to some embodiments such optional coverage net rating may be calculated in an automated fashion using automated processing platform 102 of FIG. 1. In some embodiments, the optional coverage net rating may be calculated upon request by an agent, or automatically in response to a quote request (such as the quote request received at 402 of FIG. 4). Calculation of optional coverage net rating will now be described by reference to FIG. 5, where a process 500 is shown that may be implemented using the automated processing platform 102 of FIG. 1.

Figure 4:
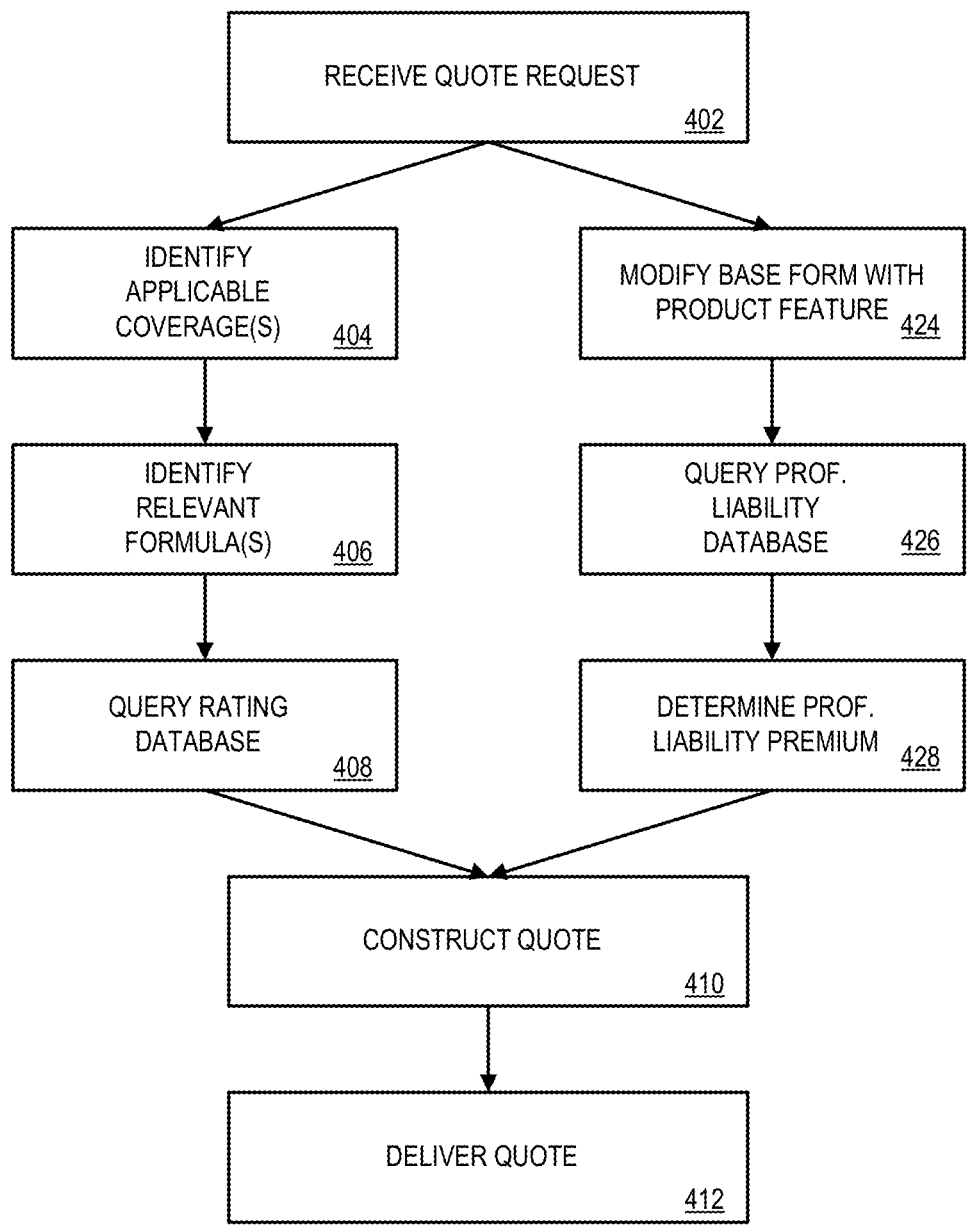
FIG. 4 illustrates a further method according to some embodiments of the present invention.
Figure 5:
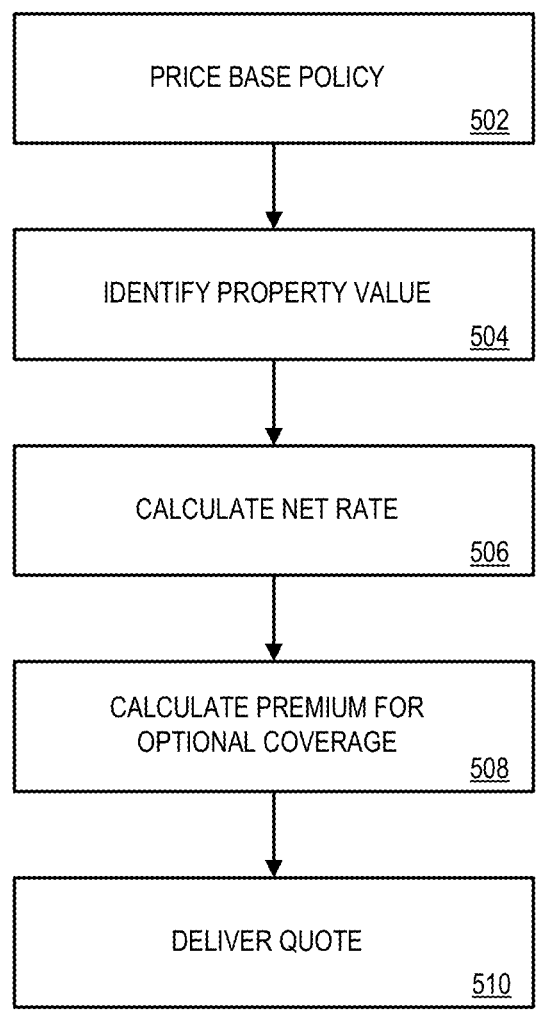
FIG. 5 illustrates a further method according to some embodiments of the present invention.

Process 500 begins at 502 where the base policy is priced (e.g., in conjunction with the process 400 of FIG. 4). Pursuant to some embodiments, pricing and rates for optional coverage are performed as a function of an insured's underlying base coverage for the policy (e.g., an optional accounts receivables coverage is a function of the underlying contents coverage rating). That is, pursuant to some embodiments, the optional coverage is priced as a direct function of the pricing of the underlying policy. In this manner, the rating variables are considered in pricing the optional coverage, without additional underwriting or analysis. For example, in some embodiments, once base coverage has been determined for a business, the underlying rating variables have been created. To price an optional coverage, an agent may simply interact with an agent terminal to quickly obtain pricing for the optional coverage.

Pricing the optional coverage continues at 504 where the basic premium (or the net premium, where the net premium is the net premium of the predominant location on the policy) associated with the property is obtained (from the original underwriting analysis). Next, at 506 the net rate is computed by first identifying the value of the property (e.g., from the information entered for the base policy application). The value of the property is divided by the premium to arrive at the net rate. Processing continues at 508 where the net rate is multiplied by the amount of the optional endorsement to arrive at a monthly premium amount for the optional coverage. As an illustrative example, assume an insured property has a value of $8 Million, and the base policy premium is $80k, resulting in a net rate of 0.01. If the building owner wishes to obtain an optional $30k endorsement, the monthly premium for the endorsement is $30k*0.01 or $30. The quote for the optional coverage is then delivered at 510. Applicants have discovered that such an optional coverage net rating method ensures that rating variables are "built in" to the optional coverage pricing and allow the efficient, automated, and predictable pricing of optional coverages.

Pursuant to some embodiments, fees associated with other underwriting expenses are assigned to individual policies based on industry, risk, and coverage composition factors, allowing expenses to be fairly and predictably be allocated among policy holders. Applicants recognized that a number of "other" underwriting expenses are associated with underwriting business insurance policies, and that the fair and predictable allocation of those other underwriting expenses is required. Pursuant to some embodiments, expenses are split to fixed and variable. Applicants have recognized that the fixed fee burden from a given policy varies with the complexity of the insured based on the likelihood of incurring claim adjuster time and travel expense, ADM validation requirements, loss control report order occurrences and call center volume.

Figure 6:
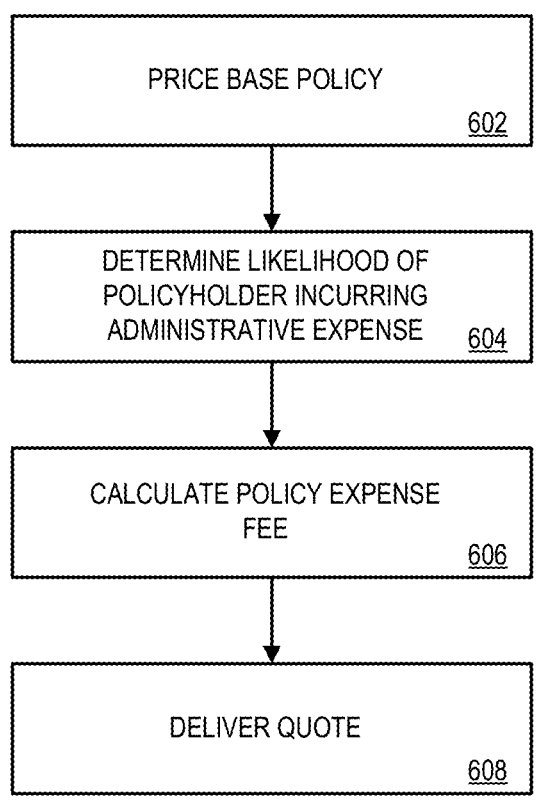
FIG. 6 illustrates a further method according to some embodiments of the present invention.

An expense fee calculation process 600 is shown in FIG. 6. Process 600 begins at 602 where the base policy is priced (e.g., using the process 400 of FIG. 4). At 604 the automated processing platform 110 operates (e.g., using the quoting module 114) to determine the likelihood of the particular policyholder (or potential policyholder) incurring administrative expenses. The likelihood may be determined, for example, by consulting expense fee tables stored in rating database 120. Pursuant to some embodiments, the expense fee tables include allocations developed using both generalized linear model ("GLM") frameworks to predict the likelihood of expense occurrence and actual expense information. As an example, in some embodiments, the following allocations are used: (1) pure overhead expenses are allocated as a fixed fee per policy, (2) administration validation expenses are allocated based on a calculated likelihood of validation, (3) loss control survey expenses are allocated based on a calculated likelihood of a survey being required, (4) administration expenses are allocated based on claim handler salary and expense information, and (5) billing expenses are allocated based on call center volume.

For those allocations (such as items (2)-(3), above) requiring a calculated likelihood, processing continues at 606 and embodiments utilize actual cost information in conjunction with a predictive model (such as a GLM) to determine the likelihood that a particular policy holder requiring a particular expense. The result is an expense fee calculation that fairly and reliably applies other underwriting expenses across policies. The expense fee is used to update the quote and returned to the agent device for delivery to the business owner or representative.

Figure 7:
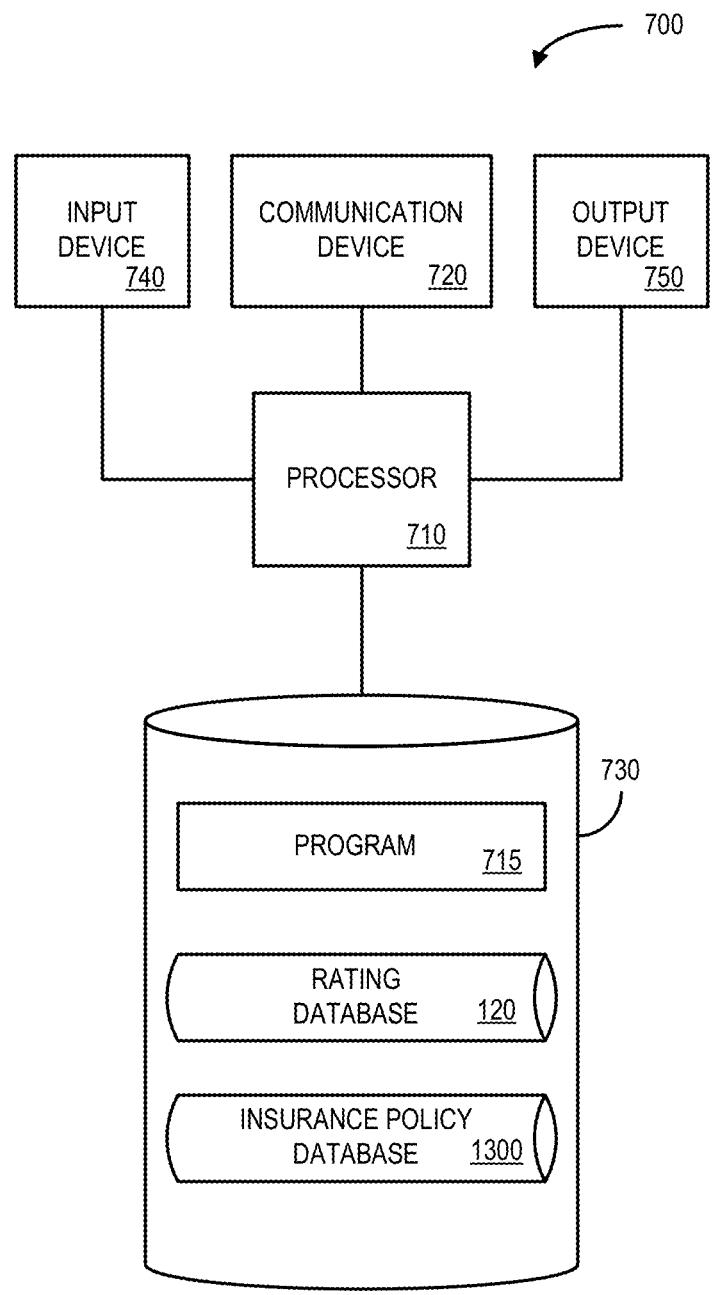
FIG. 7 is a block diagram of an insurance apparatus in accordance with some embodiments of the present invention.

FIG. 7 is a block diagram of an insurance apparatus 700 in accordance with some embodiments of the present invention. The apparatus 700 might, for example, comprise a platform or engine similar to the platform 110 illustrated in FIG. 1. The apparatus 700 comprises a processor 710, such as one or more INTEL® Pentium® processors, coupled to a communication device 720 configured to communicate via a communication network (not shown in FIG. 7). The communication device 720 may be used to exchange quote requests and quotes, for example, with one or more remote devices (e.g., such as the agent devices 130*a-n* of FIG. 1) and to retrieve or receive data from third party data sources (e.g., such as data sources 140*a-n* of FIG. 1).

The processor 710 is also in communication with an input device 740. The input device 740 may comprise, for example, a keyboard, a mouse, or computer media reader. Such an input device 740 may be used, for example, to enter information about existing or proposed policy rating methodologies, rating schedules, or the like. The processor 710 is also in communication with an output device 750. The output device 750 may comprise, for example, a display screen or printer. Such an output device 750 may be used, for example, to provide reports and/or display information associated with policy rating methodologies, rating schedules, quotes, or the like.

The processor 710 is also in communication with a storage device 730. The storage device 730 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance any embodiments of the present invention described herein.

For example, the processor 710 may determine applicable coverages, including professional liability coverage, associated with a quote request received from an agent device. The processor 710 may also identify relevant formula(s) to be used in constructing and delivering a quote for a new or updated policy. The processor 710 may also calculate and deliver pricing for one or more optional coverages and/or expense fees associated with a policy.

As used herein, information may be "received" by or "transmitted" to, for example: (i) the insurance apparatus 700 from other devices; or (ii) a software application or module within the insurance apparatus 700 from another software application, module, or any other source.

As shown in FIG. 7, the storage device 730 also stores or is otherwise in communication with a rating data 120 (e.g., such as the database 120 of FIG. 1) and/or an insurance policy database 1300. Any number of other databases or database arrangements could be employed besides those suggested by the figures. For example, different databases associated with different types of rating methodologies, businesses, or policies might be associated with the apparatus 700.

The insurance apparatus 700 may be used to offer low to medium hazard classes of businesses a professional liability insurance expansion opportunity. Note that many small business owners may consider professional liability insurance to be a necessary coverage they would prefer to be embedded into a typical business owner's insurance policy. In this way, a product feature may provide enhanced coverage tailored to the needs of small business owners. In particular, a robust base form might be associated with disciplinary proceedings defense coverage, personal injury coverage, a settlement clause, punitive damages coverage, a defense within limits clause, a subpoena assistance defense coverage clause, and/or a mediation resolution give back clause.

Note that different types or classes of businesses might be interested in professional liability insurance. By way of example only, the classes of businesses might include an accounting and auditing service, an advertising agency, an answering service, a business and management consultant, a wedding consultant, a copying and duplicating service, a court reporting service, a graphic artist and designer, an embroidery operation, an interior decorator, an interpreter or translator, a market research firm, a notary public, a public speaker, a stenographic and secretarial service, a tax preparer and bookkeeper, a telemarketing firm, and/or) a travel agency.

Figure 11:
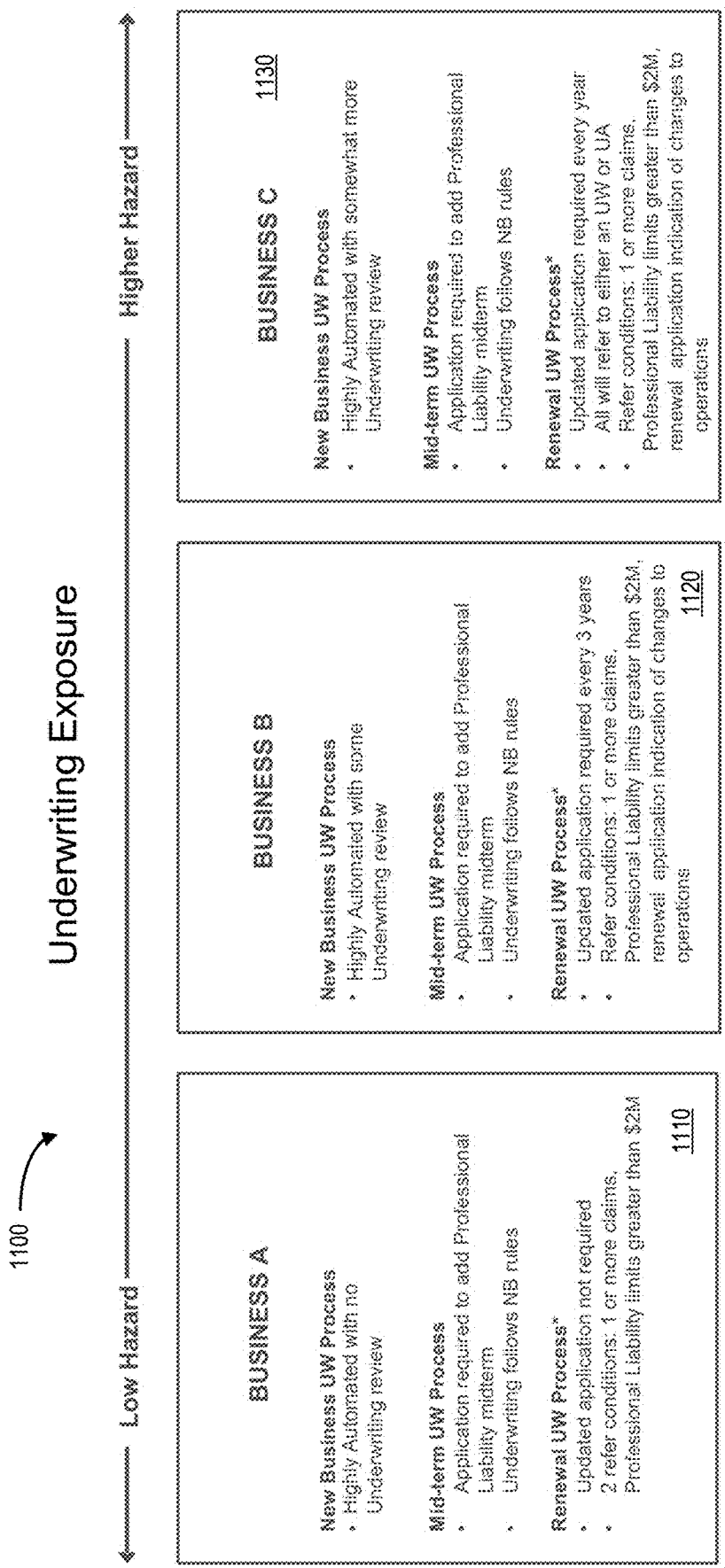
FIG. 11 is a high level overview of insurance processes associated with various categories of underwriting risks according to some embodiments.

Note that, with respect to professional liability insurance, different business types or classes may be associated with different underwriting risks. Moreover, different underwriting risks might be associated with different insurance processes. For example, FIG. 11 is a high level overview of insurance processes 1100 associated with various categories of underwriting risks according to some embodiments. In particular, a first process 1110 associated with a relatively low hazard business type (e.g., embroidery, answering service, etc.). In the first process 1110, class specific questions for a new professional liability submission may result in either a bindable quote or a hard stop. In the case of a renewal, an updated application might not be required in the first process 1110.

A second process 1120 may be associated with a mid-level hazard business type (e.g., copying service, advertising agency, etc.). In the second process 1120, all new business underwriting is performed by a professional liability specialist. In the case of a renewal, an updated application might be required every three years in the second process 1120. A third process 1130 may be associated with a relatively high hazard business type (e.g., accountants, business/management consultants, etc.). In the third process 1130, all new business underwriting is performed by a professional liability specialist. In the case of a renewal, an updated application might be required every year in the second process 1130.

Figure 12:
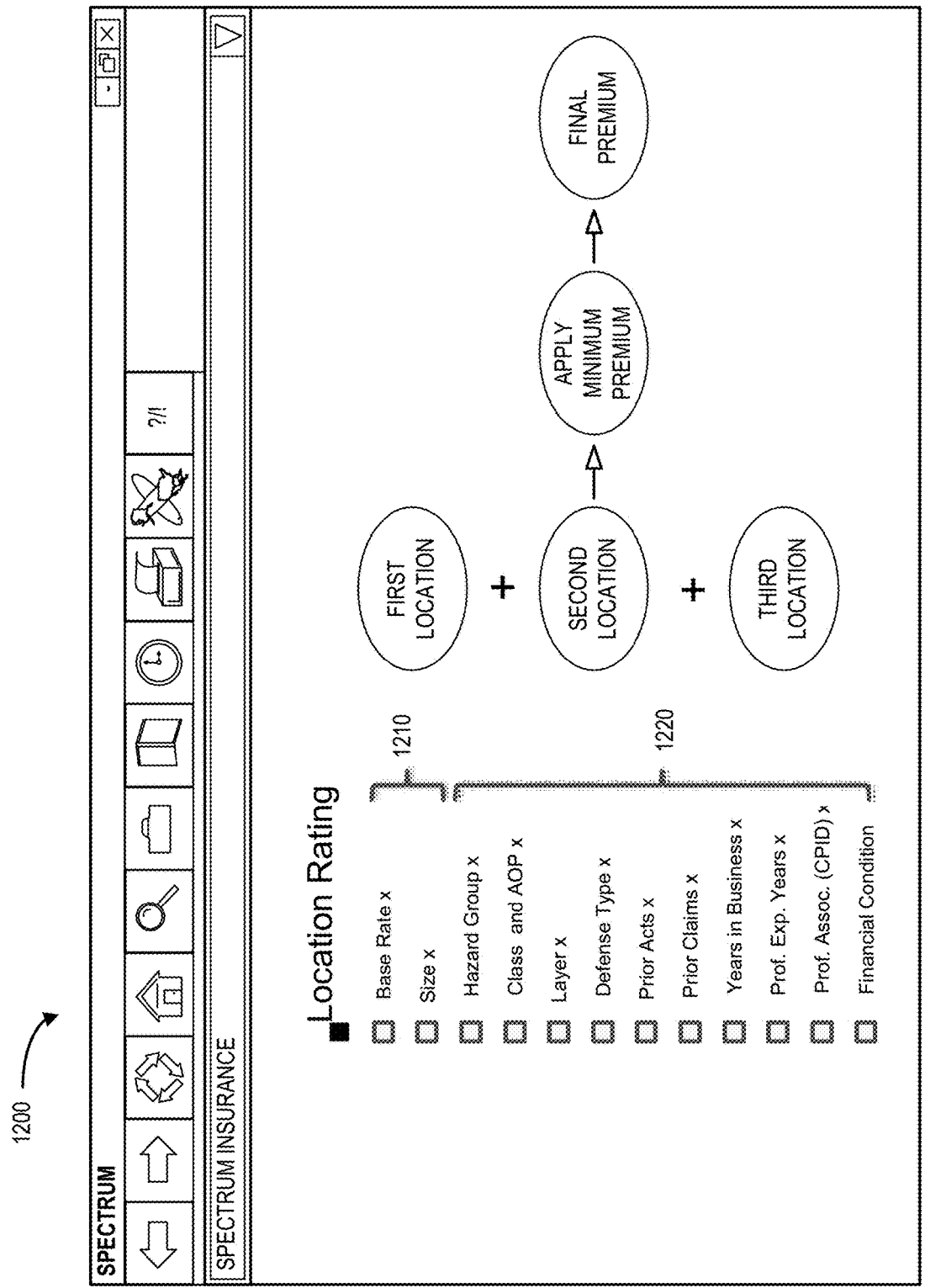
FIG. 12 illustrates a graphical user interface to provide professional liability rating information according to some embodiments.

FIG. 12 illustrates a GUI display 1200 to provide professional liability rating information according to some embodiments. In particular, a first area 1210 of the display 1200 may be used to provide location specific rating information, including at least one of a base rate and a business size. A second area 1220 of the display 1200 may be used to provide policy level rating information, including at least one of: (i) a hazard group, (ii) a business class, (iii) a layer, (iv) a defense type, (v) prior acts, (vi) prior claims, (vii) years in business, (viii) years of professional experience, (ix) a professional association, and/or (x) a financial condition.

The final rating structure may be determined by locations values for a number of different locations associated with the business (three different locations in the example of FIG. 12) and a minimum premium value to establish a final premium value to be used in the quote.

FIG. 13 is a portion of a tabular insurance policy database 1300 storing insurance information in accordance with some embodiments. The table may include, for example, entries identifying insurance policies and/or insurance quotes. The table may also define fields 1302, 1304, 1306, 1308, 1310 for each of the entries. The fields 1302, 1304, 1306, 1308, 1310 may, according to some embodiments, specify: an insurance policy identifier 1302, a price of business owner's policy coverage 1304, product feature 1306, a price of professional liability coverage 1308, and indications of one or more insurance claims 1310. The insurance policy database 1300 may be created and updated, for example, based on information electrically received from a potential insured, received from an insurance agent, and/or that is automatically determined and/or predicted by an insurance enterprise.

The insurance policy identifier 1302 may be, for example, a unique alphanumeric code identifying an insurance policy or quote (and may be associated with a ZIP code, town name, latitude and longitude, geographic state, street address, etc.). The price of business owner's policy coverage 1304 might indicate the price determined based on the ZIP code. The product feature 1306 may, for example, be mandatory and/or class-specific—such as a coverage limit or deductible amount. The price of professional liability coverage 1308 might have been calculated, according to some embodiments, in parallel with the price of business owner's policy coverage 1304. The indications of one or more insurance claims 1310 might be associated with normal business insurance claims and/or professional liability insurance claims. By having all of the claim information in a single database, the ability to analyze and access the data may be improved.

Figure 14:
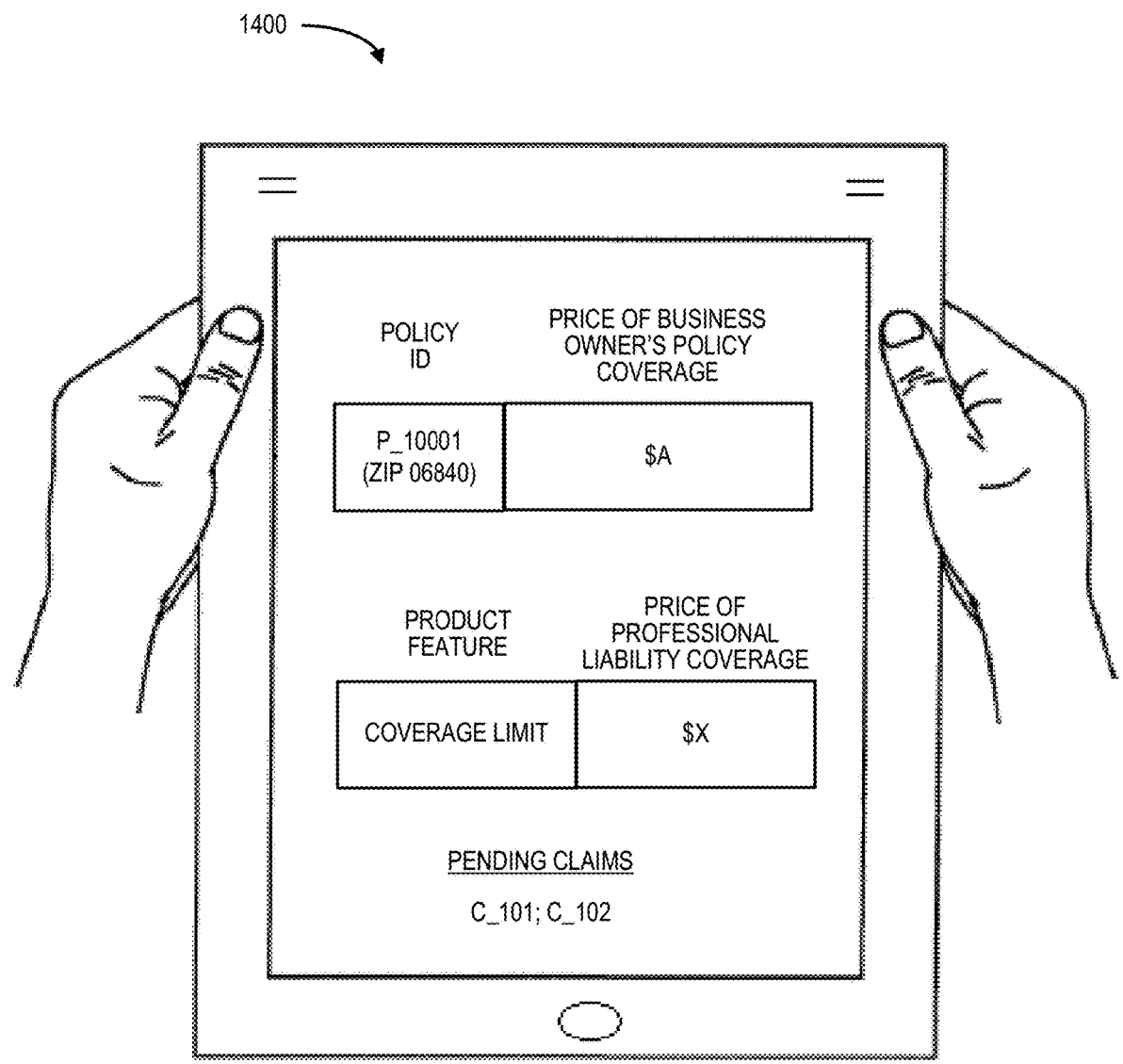
FIG. 14 illustrates a tablet computer displaying insurance related information according to some embodiments.

FIG. 14 illustrates a tablet computer displaying insurance related information 1400 according to some embodiments. The information 1400 includes an insurance policy identifier, a price of business owner's policy coverage, endorsement product feature, a price of professional liability coverage, and indications of one or more insurance claims. By having a single GUI display include both business insurance and professional liability insurance information, the ability of an agent or business owner to understand the information may be improved.

As a result of the embodiments described herein, improved rate and pricing specificity and flexibility for business insurance policies may be achieved for both business owner's insurance and professional liability insurance. Further, embodiments allow some or all steps associated with the quoting process to be automated and/or performed in parallel, thereby reducing errors and improving efficiency of the quoting process. Embodiments establish base rates by coverage, amount of insurance relativities, territories and using an enhanced pricing model based on historical loss data and current demographic, geographical and other data.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems).

Pursuant to some embodiments, features from the territorial analysis described above may be extended to model and create classification structures for catastrophe-related losses (e.g., such as hurricanes or the like). As an initial step, classification structures for catastrophe and non-catastrophe losses were modeled separately (e.g., using GLM techniques). Then, pursuant to some embodiments, to create a total loss classification system, the total of the modeled results for the catastrophe and non-catastrophe losses was further modeled. Applicants recognized that such an approach allowed a more granular analysis and the creation of accurate and relevant results for territories (such as States or other geographical regions) with catastrophe exposure. In this manner, catastrophe losses may be included in premiums in proportion to non-catastrophe premiums The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. An apparatus to improve processing associated with automated dynamic rating application, comprising:
   a communication device to receive, from a remote device via a communication network, single input information provided at the remote device including information associated with a business including a quote request, for at least one of business owner's policy coverage or standalone general liability coverage, specifying a business type and a business location, and to transmit the single input information to a plurality of platforms, thereby reducing errors in input information;
   a first computing platform coupled to the communication device, including:
      a first processor coupled to the communication device; and
      a first storage device in communication with the first processor and storing instructions defining an automated dynamic rating application and adapted to be executed by the processor to:
         receive, via the communication device, the single input information provided at the remote device;
         identify at least a first applicable business owner's policy coverage or standalone general liability coverage based on receipt of the business type and the business location from the communication device responsive to the request for quote,
         based on the at least a first applicable business owner's policy coverage or standalone general liability coverage, identify at least a first relevant coverage formula including at least a first territory factor and data lookups to retrieve and apply a relevant rate from a business owner's policy coverage rating database, the at least a first territory factor based on the geographical location of the business,
         receive claim data from a claims processing system, the claims processing system associated with the remote device and adapted to receive information about a claim, determine Extended Reporting Period ("ERP") information associated with the claim, and provide claim data to the automated dynamic rating application; and
         query a rating database using the at least a first relevant coverage formula, the business type the business location, and the received claim data, the query resulting in at least a first price for the at least first applicable business owner's policy coverage or standalone general liability coverage; and
   a second computing platform coupled to the communication device, operating in parallel with the first computing platform, including:
      a second processor;
      a second storage device in communication with the second processor and storing instructions adapted to be executed by the processor to:
         receive, via the communication device, the single input information provided at the remote device;
         responsive to receipt of the single input information provided at the remote device, based on the business type automatically received in parallel with the first computing platform from the communication device, responsive to the quote request, modify a base professional liability form with at least one product feature, and
         query a professional liability rating database using the business type, business location, and the at least one product feature, the query resulting in a professional liability premium value,
      wherein the second computing platform is configured to process the single input information in parallel with the first computing platform, thereby providing an expedited response to the single input information;
   wherein the apparatus is configured to transmit a response to the quote request, the response including the at least a first price, the at least first applicable coverage, and the professional liability premium value; and
   wherein the apparatus is further configured to:
   store, in a single database, data indicative of an insurance policy identifier, a price of coverage corresponding to the first price, the at least one product feature, a price based on the professional liability premium value, and to generate and provide to the remote device, in response to the single input information, a single graphical user interface display, employing data items extracted from the single database, showing on the single graphical user interface display results from the first and second platforms, including a policy identifier, a price of coverage corresponding to the first price, the at least one product feature, and the price based on the professional liability coverage feature.

2. The apparatus of claim 1, further comprising a claims processing system coupled to the automated dynamic rating application and adapted to receive information about a claim, determine extended reporting period information associated with the claim, and provide claim data to the automated dynamic rating application.

3. The apparatus of claim 1, wherein the at least a first territory factor is selected based on a ZIP code associated with the business location.

4. The apparatus of claim 1, wherein the at least a first territory factor comprises a plurality of ZIP codes and the professional liability premium value is calculated in accordance with the plurality of ZIP codes.

5. The apparatus of claim 1, wherein the at least a first relevant coverage formula is at least one of a building rating formula, a business personal property rating formula, a personal property of others rating formula, a product rating formula, a PREM/OPS formula, a business interruption rating formula, an equipment breakdown formula, a policy expense fee rating formula, and an optional coverage rating formula.

6. The apparatus of claim 1, wherein the first storage device further stores instructions adapted to be executed by the processor to identify a coverage type associated with said quote request, said coverage type at least one of a building, contents, business income, and liability.

7. The apparatus of claim 1, wherein the business type indicates at least one of: (i) an accounting and auditing service, (ii) an advertising agency, (iii) an answering service, (iv) a business and management consultant, (v) a copying and duplicating service, (vi) an embroidery operation, and (vii) another business type.

8. The apparatus of claim 1, wherein the second storage device further stores instructions adapted to be executed by the processor to:
assign the business to be insured into one of a set of potential underwriting exposure hazard classifications based on the business type,
wherein an underwriting process is selected in accordance with the assigned potential underwriting exposure hazard classification.

9. The apparatus of claim 8, wherein the professional liability premium value is based at least in part on the assigned potential underwriting exposure hazard classification.

10. The apparatus of claim 9, wherein the set of potential underwriting exposure hazard classifications include: (i) a relatively low hazard underwriting exposure, (ii) a medium hazard underwriting exposure, and (iii) a relatively high hazard underwriting exposure.

11. The apparatus of claim 1, wherein the professional liability premium value is based at least in part on both a location specific rating and a policy level rating.

12. The apparatus of claim 11, wherein the location specific rating includes at least one of a base rate and a business size.

13. The apparatus of claim 11, wherein the policy level rating includes at least one of: (i) a hazard group, (ii) a business class, (iii) a layer, (iv) a defense type, (v) prior acts, (vi) prior claims, (vii) years in business, (viii) years of professional experience, (ix) a professional association, and (x) a financial condition.

14. A system for dynamic processing of automated rating applications, comprising:
a communication device to receive, from a remote device via a communication network, single input information provided at the remote device including information associated with a business to be insured including a quote request for business owner's policy coverage, for the business specifying a business type and a business location, and to transmit the single input information to a plurality of platforms, thereby reducing errors in input information;
a first computing platform coupled to the communication device, including a first processor coupled to the communication device and a first storage device in communication with the first processor and storing instructions defining an automated dynamic rating application and adapted to be executed by the processor to:
identify at least a first applicable business owner's policy coverage based on receipt of the business type and the business location from the communication device responsive to the request for quote,
receive claim data from a claims processing system, the claims processing system associated with the remote device and adapted to receive information about a claim, determine Extended Reporting Period ("ERP") information associated with the claim, and provide claim data to the automated dynamic rating application; and
query a business owner's policy coverage rating database using the business type, the business location and the received claim data, the query resulting in at least a first price for the at least first applicable business owner's policy coverage; and
a second computing platform coupled to the communication device, operating in parallel with the first computing platform, including a second processor and a second storage device in communication with the second processor and storing instructions adapted to be executed by the second processor to:
receive, via the communication device, the single input information provided at the remote device;
based on the data received via the communication device, including business type automatically received in parallel with the first computing platform from the communication device, responsive to the quote request, modify a base professional liability form with at least one product feature, and
query a professional liability rating database using the business type, business location, and the at least one product feature, the query resulting in a professional liability premium value,
wherein the second computing platform is configured to process the single input information in parallel with the first computing platform, thereby providing an expedited response to the single input information;
wherein the system is configured to transmit a response to the quote request, the response including the at least a first price, the at least first applicable coverage, and the professional liability premium value; and
wherein the system is further configured to: store, in a single database, data indicative of an insurance policy identifier, a price of coverage corresponding to the first price, the at least one product feature, a price based on the professional liability premium value, and to generate and provide to the remote device, in response to the single input information, a single graphical user interface display, employing data items extracted from the single database, showing on the single graphical user interface display results from the first and second platforms, including a policy identifier, a price of coverage corresponding to the first price, the at least one product feature, and the price based on the professional liability coverage feature.

15. The system of claim 14, wherein the first storage device further stores instructions adapted to be executed by the processor to identify a coverage type associated with said quote request, said coverage type at least one of a building, contents, business income, and liability.

16. The system of claim 14, wherein the business type indicates at least one of: (i) an accounting and auditing service, (ii) an advertising agency, (iii) an answering service, (iv) a business and management consultant, (v) a copying and duplicating service, (vii) an embroidery operation, and (vii) another business type.

17. The system of claim 14, wherein the second storage device further stores instructions adapted to be executed by the processor to:

assign the business to be insured into one of a set of potential underwriting exposure hazard classifications based on the business type, wherein an underwriting process is selected in accordance with the assigned potential underwriting exposure hazard classification.

18. The system of claim 17, wherein the professional liability premium value is based at least in part on the assigned potential underwriting exposure hazard classification.

19. The system of claim 18, wherein the set of potential underwriting exposure hazard classifications include: (i) a relatively low hazard underwriting exposure, (ii) a medium hazard underwriting exposure, and (iii) a relatively high hazard underwriting exposure.

20. The system of claim 14, wherein the professional liability premium value is based at least in part on both a location specific rating and a policy level rating.

21. The system of claim 20, wherein the location specific rating includes at least one of a base rate and a business size.

22. The system of claim 20, wherein the policy level rating includes at least one of: (i) a hazard group, (ii) a business class, (iii) a layer, (iv) a defense type, (v) prior acts, (vi) prior claims, (vii) years in business, (viii) years of professional experience, (ix) a professional association, and (x) a financial condition.

* * * * *